J. MARCINKOWSKI & J. BUŃDA.
AUTOMOBILE STEERING ATTACHMENT AND SELF STARTING DEVICE.
APPLICATION FILED JUNE 29, 1916.
1,224,402.
Patented May 1, 1917.
2 SHEETS—SHEET 1.
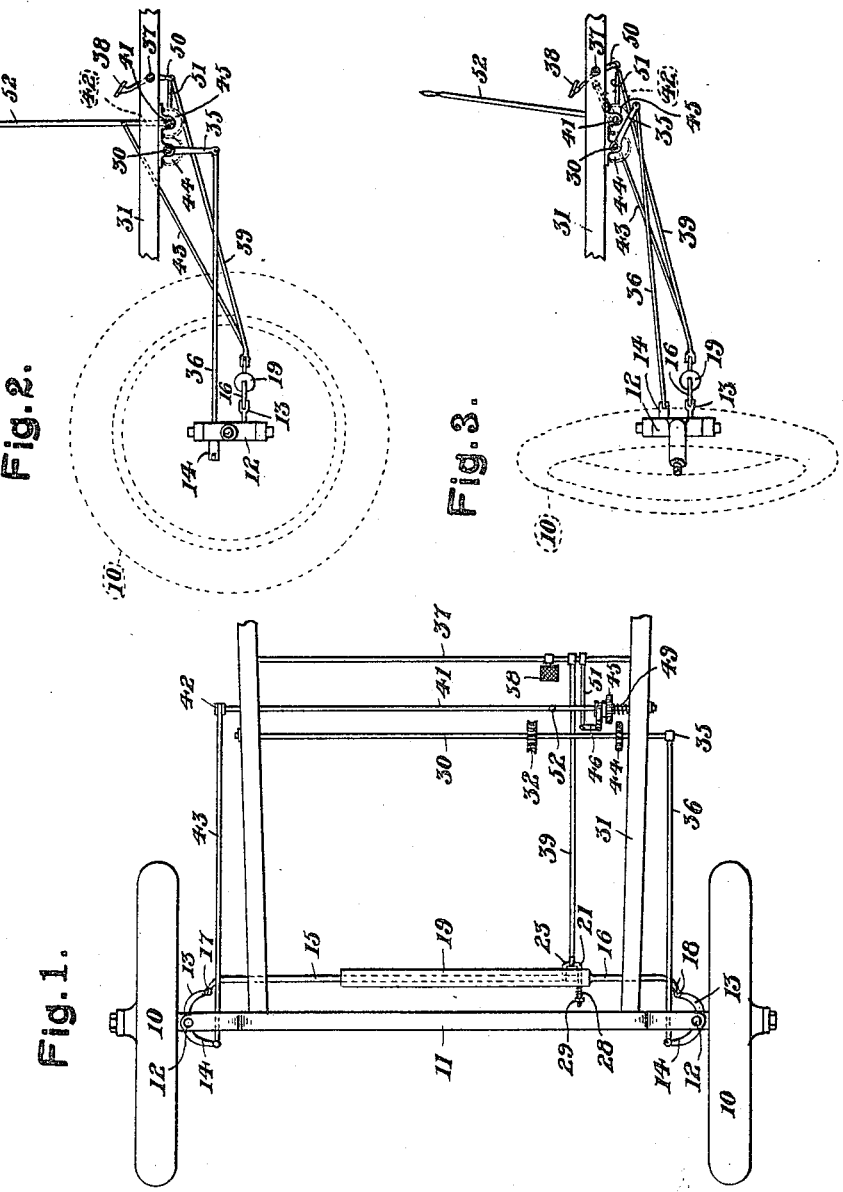
Inventors,
J. Marcinkowski
J. Buńda
By A. M. Wilson
Attorney

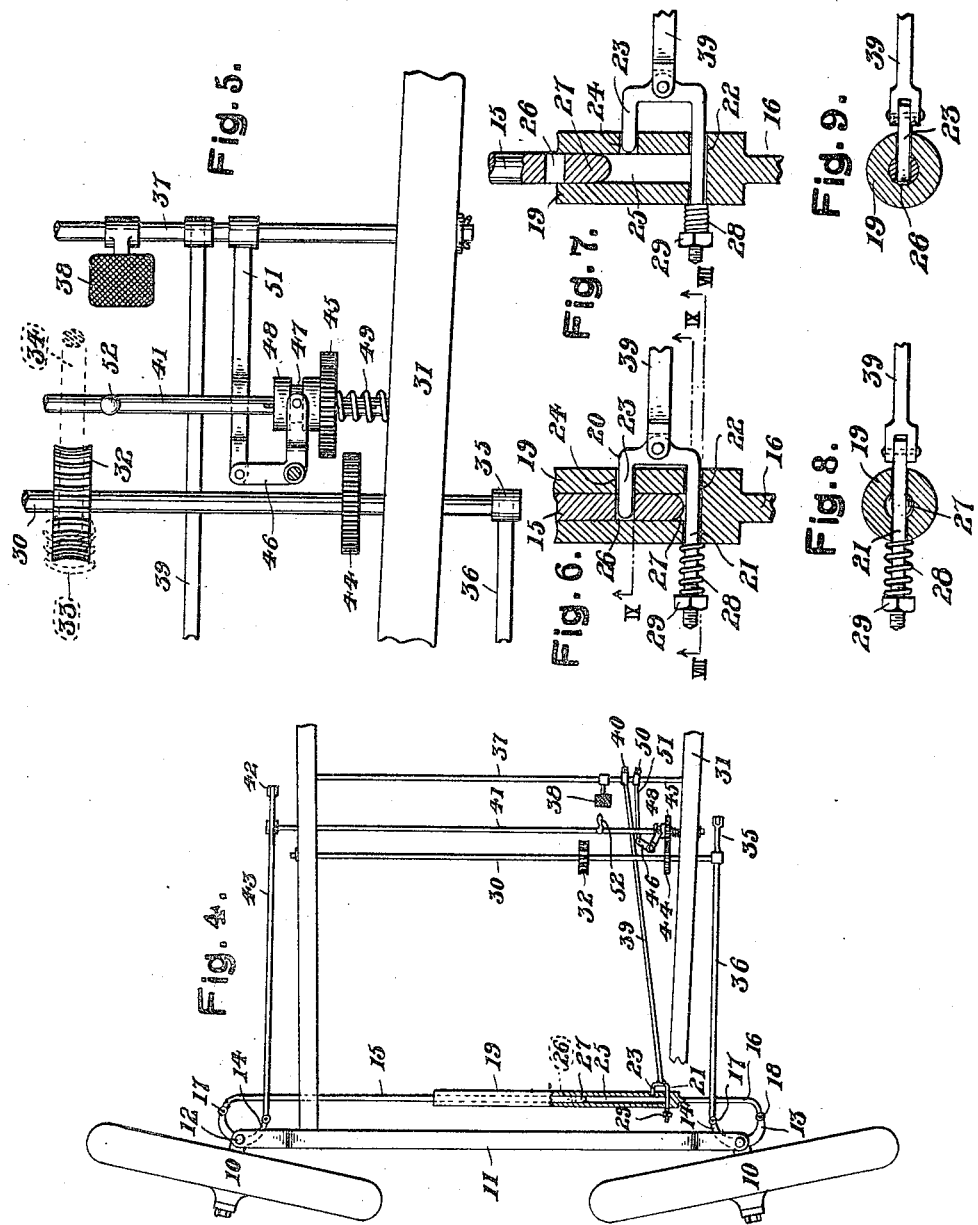

UNITED STATES PATENT OFFICE.

JÓZEF MARCINKOWSKI AND JOHN BUŃDA, OF CHICAGO, ILLINOIS.

AUTOMOBILE STEERING ATTACHMENT AND SELF-STARTING DEVICE.

1,224,402.

Specification of Letters Patent.

Patented May 1, 1917.

Application filed June 29, 1916. Serial No. 106,700.

*To all whom it may concern:*

Be it known that we, JÓZEF MARCINKOWSKI and JOHN BUŃDA, subjects of the Emperor of Austria-Hungary, residing at Chicago, in the county of Cook and State of Illinois, have invented certain new and useful Improvements in Automobile Steering Attachments and Self-Starting Devices, of which the following is a specification.

This invention relates to new and useful improvements in automobile steering attachments and self starting devices.

The primary object of this invention is the provision for shifting the front wheels of a vehicle from the driver's seat thereof so that the vehicle may be turned around in a small space without the necessity of running the vehicle backward.

The invention contemplates providing auxiliary shifting rods for the steering knuckles of the forward wheels of an automobile, the same being movable by means of a member operatively clutched up with the said rods upon releasing the transverse connecting tie employed between the usual steering knuckles of the said wheels, the connection between the usual steering knuckles being reëstablished upon disconnecting such clutching means.

A further object of the invention is to provide a means for bodily shifting the steering wheels of an automobile inwardly toward each other forwardly of the machine and again returning the same to their normal positions, such operations being accomplished by a hand operated means, the regular steering of the vehicle being normally effected in substantially the usual manner.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1 is a top plan view of the forward portion of an automobile chassis provided with the present arrangement of steering connections.

Fig. 2 is a side elevation of the operative portion thereof in the normal position with one of the forward wheels shown in dotted lines.

Fig. 3 is a view similar to Fig. 2 with said wheels illustrated turned at an extreme angle.

Fig. 4 is a view similar to Fig. 1 with the forward wheels turned to their inward limit.

Fig. 5 is an enlarged detail view of the pedal operating means and adjacent elements.

Fig. 6 is an enlarged sectional view of the latch arrangement for the connecting rod in its engaged position.

Fig. 7 is a similar view with the latch disconnected.

Figs. 8 and 9 are transverse sectional views taken upon lines VIII—VIII and IX—IX respectively, of Fig. 6.

The invention being a steering arrangement for a vehicle whereby the same may be steered in the usual manner or at greater extremes of turning as may be desired, the invention is herein illustrated in connection with the usual forward steering wheels 10 of a vehicle having a forward axle 11 to which the said wheels are shiftably mounted by means of steering knuckles 12, each of the said knuckles having a rearwardly and a forwardly extending steering arm 13 and 14 respectively, and by means of which arms the wheels 10 may be shifted by means of the knuckles 12 in different steering operations.

The rear knuckle arms 13 are provided with a combination connecting rod in the form of steering rods 15 and 16 having their outer ends respectively pivoted to the rear free ends of the rear arms 13 as at 17 and 18, it being understood however that a connection is effected between the rods 15 and 16 whereby the same are longitudinally shiftable as a single element in the usual steering operation of the vehicle by means of a tubular extension 19 carried by the free end of the rod 16 and within which the rod 15 is slidably telescopically received.

An L-shaped latch 20 has its relatively long arm 21 slidably mounted through a transverse opening 22 in the tubular extension 19 while the relatively shorter arm or finger 23 of the latch 20 projects through an opening 24 in the said tubular member 19 and extending into the central axial bore 25 thereof is adapted for reception within a transverse keeper opening 26 adjacent the inner curved end 27 of the rod 15.

An expansion spring 28 carried by the latch arm 21 and tensioned by means of a turn nut 29 upon the said arm normally retains the latch in its closed position, it being understood that a forcible insertion of the rod 15 within the tube 19 will cause the latch 20 to open and automatically engage the rod 15, thus connecting together the rear steering arms 13 and whereby any steering shifting of either of the wheels 10 imparts a corresponding bodily movement of the opposite wheel.

A steering shaft is journaled transversely of the vehicle frame 31 and is provided with a worm gear 32 adapted to mesh with a worm 33 upon the lower end of a steering post 34 herein indicated by dotted lines and whereby as will be evident, a turning of the steering post 34 effects a partial revolving of the steering shaft 30.

A crank 35 upon the laterally projecting end of the shaft 30 is connected by a steering link 36 with the free end of the forward arm 14 of the adjacently positioned forward wheel 10. From the foregoing description, it will be evident that the usual turning of the steering post 34 which revolves the steering shaft 30, will longitudinally shift the link 36 by means of the crank 35 and whereby the adjacent wheel 10 will be shifted in the steering operation and by reason of the connection between the rear arms 13, the opposite wheel 10 will be steered in a corresponding direction.

A rock shaft 37 is transversely journaled upon the frame 31 rearwardly of the steering shaft 30 and is provided with a pedal 38 for operatively turning the said rock shaft. A link 39 is pivotally connected between the latch 20 and a depending arm carried by the shaft 37, as at 40 and by which it will be noted that a forward impulse imparted to the pedal 38 by the downward movement of the foot of the operator will result in rearwardly shifting the arm 40 and the link 39 for withdrawing the latch 20 and releasing the finger 23 thereof from the keeper opening 26 of the connecting rod 15.

A wheel shifting shaft 41 is journaled transversely of the frame 31 at a point intermediate the aforementioned shafts 30 and 37 and is provided with an upwardly extending crank arm 42 at its outer end at the opposite side of the machine frame 31 from that at which the crank 35 is located. A connecting link 43 is pivotally connected between the free end of the arm 42 and the forward steering arm 14 of the adjacently positioned wheel 10.

A gear 44 is fixed upon the steering shaft 30 while a similar gear 45 is slidably splined upon the shaft 41 being adapted to be brought into mesh with the gear 44 by means of an angular clutch lever 46 having a bearing within the annular groove 47 of the collar 48 with which the said gear 45 is provided, an expansive spring 49 being arranged for normally maintaining the gear 45 out of operative engagement with the gear 44. A clutch arm 50 is dependingly carried by the rock shaft 37 and is connected with the free end of the rock lever 46 by the pivotal link 51.

A steering lever 52 is arranged upright upon the wheel shifting shaft 41 and it will be apparent that when the elements are in their normal arrangements as best illustrated in Figs. 1, 5 and 6 of the drawings, the wheels 10 may be shifted in corresponding directions in the usual steering of the vehicle by means of the steering post 34, as hereinbefore set forth. When desired to shift the wheels 10 forwardly and inwardly to the positions illustrated in Fig. 4 of the drawings for accomplishing an unusually short turn of the vehicle, the pedal 38 is depressed which withdraws the latch 20 by means of the link 39 and arm 40 thereby separating the two portions 15 and 16 of the connecting means for the rear steering arms 13 of the wheels 10. This same forward downward movement of the pedal 38 shifts the gear 45 into meshing relation with the gear 44 by means of the lever 46, the link 51 and the clutch arm 50, as hereinbefore described. The hand lever 52 may then be grasped by the operator and by shifting the same rearwardly, the shifting shaft 41 is turned and moves the arm 42 therewith, thus exerting a pull upon the knuckle arm 14 and shifts the wheel 10 connected thereto inwardly and forwardly of the machine. Such rearward movement of the lever 52 also imparts a partial rotation to the meshing gears 45 and 44, whereby the steering shaft 30 is partially turned which swings rearwardly the arm 35 thereof exerting a pull upon the link 36 and upon the knuckle arm 14 of the adjacent wheel 10 turning the latter also forwardly and inwardly, the arrangement then being as illustrated in Fig. 4 of the drawings. With the front wheels 10 so positioned, the front portion of the vehicle may be forcibly moved sidewise upon the wheels 10 employing the rear wheels of the vehicle as a pivot while the motor power of the vehicle may be employed for continuing the turning of the vehicle after the same has been forcibly initially started in the turning operation. It is preferable to maintain the foot upon the pedal 38 and the gears 44 and 45 in mesh during the entire turning operation, thus controlling the angular position of the wheels 10 by means of the hand lever 52 and by means of which lever, the wheels are again returned to their normal straight positions at the opposite sides of the vehicle at the completion of the turning operation. With the wheels 10 so normally positioned, the connecting rod portion 15 will be arranged inwardly of the bore 25 so that upon a release of the pedal 38, the spring 49 returns the rock shaft 37 to its normal position, disengaging the gear 45 from the gear 44 and re-locking the latch 20 which operation is assisted by means of the latch spring 28.

It will thus be evident that a serviceable auxiliary steering means is provided for exceptional cases in connection with an adequate steering means for ordinary service, the entire mechanism being simple and inexpensive and consuming but little additional space upon the vehicle.

What is claimed as new is:—

1. A steering device for vehicles comprising forward ground wheels having pivoted steering knuckles, a forward and a rear steering arm carried by each of the said knuckles, a disconnectible sectional connection pivotally arranged between the said rear arms, a transversely arranged steering shaft, shiftable connections between the said shaft and the forward arm of one of the said wheels and steering means operatively connected to the said shaft.

2. A steering device for vehicles comprising forward ground wheels having pivoted steering knuckles, a forward and a rear steering arm carried by each of the said knuckles, a disconnectible sectional connection pivotally arranged between the said rear arms, a transversely arranged steering shaft, shiftable connections between the said shaft and the forward arm of one of the said wheels, a transversely arranged wheel shifting shaft positioned adjacent the said steering shaft, operative connections between the said shifting shaft and the forward arm of the opposite one of said wheels, clutching means between the said shafts, a releasing latch for the sections of the said arm connecting means and a simultaneous operable closer for the said clutching means and release for the said latch.

3. A steering device for vehicles comprising forward ground wheels having pivoted steering knuckles, a forward and a rear steering arm carried by each of the said knuckles, a disconnectible sectional connection pivotally arranged between the said rear arms, a transversely arranged steering shaft, shiftable connections between the said shaft and the forward arm of one of the said wheels, a transversely arranged wheel shifting shaft positioned adjacent the said steering shaft, operative connections between the said shifting shaft and the forward arm of the opposite one of said wheels, a transversely arranged rock shaft adjacent the said shifting shaft, an operating pedal upon the said rock shaft, operative connections between the said rock shaft and latch, a fixed gear upon the said steering shaft, a shiftable gear upon the said shifting shaft normally out of mesh with the said fixed gear, and clutching means for the said shiftable gear operatively connected to the said rock shaft.

4. A steering device comprising in combination with a vehicle having forward wheels connected to the vehicle by pivoted steering knuckles, detachable connections between the said knuckles, separate shifting means for each of the said wheels, clutching connections between the said separate shifting means operable simultaneously with a release for the said connections, and operating means for the said shifting means.

5. A steering device comprising in combination with a vehicle having forward wheels connected to the vehicle by pivoted steering knuckles, detachable connections between the said knuckles, separate shifting means for each of the said wheels, a steering post operatively connected to one of the said shifting means and an operating hand lever carried by the other shifting means.

6. A steering device comprising in combination with a vehicle having forward wheels connected to the vehicle by pivoted steering knuckles, detachable connections between the said knuckles, separate shifting means for each of the said wheels, a steering post operatively connected to one of the said shifting means, an operating hand lever carried by the other shifting means, normally disengaged clutching members between the said shifting means and pedal operating means for the said clutching members.

7. A steering device comprising in combination with a vehicle having forward wheels connected to the vehicle by pivoted steering knuckles, detachable connections between the said knuckles, separate shifting means for each of the said wheels, a steering post operatively connected to one of the said shifting means, an operating hand lever carried by the other shifting means, normally disengaged clutching members between the said shifting means, pedal operating means for the said clutching members, and a release for the said detachable connections operatively connected to the said pedal operating means arranged in its released position when the said clutching members are closed.

In testimony whereof we affix our signatures.

JÓZEF MARCINKOWSKI.
JOHN BUŃDA.

Copies of this patent may be obtained for five cents each, by addressing the "Commissioner of Patents, Washington, D. C."